United States Patent
Nakamura et al.

(10) Patent No.: US 9,653,964 B2
(45) Date of Patent: May 16, 2017

(54) LINEAR ACTUATOR

(71) Applicant: MITSUBA Corporation, Gunma (JP)

(72) Inventors: Masato Nakamura, Gunma (JP); Masaki Inoue, Gunma (JP); Masatoshi Suzuki, Gunma (JP); Yusuke Tajima, Gunma (JP); Yuta Suzuki, Gunma (JP); Shinya Oki, Gunma (JP)

(73) Assignee: MITSUBA CORPORATION, Gunma (JP)

( * ) Notice: Subject to any disclaimer, the term of this patent is extended or adjusted under 35 U.S.C. 154(b) by 208 days.

(21) Appl. No.: 14/412,750

(22) PCT Filed: Jul. 3, 2013

(86) PCT No.: PCT/JP2013/068221
§ 371 (c)(1),
(2) Date: Jan. 5, 2015

(87) PCT Pub. No.: WO2014/013870
PCT Pub. Date: Jan. 23, 2014

(65) Prior Publication Data
US 2015/0180306 A1    Jun. 25, 2015

(30) Foreign Application Priority Data

Jul. 18, 2012 (JP) ................. 2012-159751

(51) Int. Cl.
*H02K 33/00* (2006.01)
*H02K 7/116* (2006.01)
(Continued)

(52) U.S. Cl.
CPC .......... *H02K 7/1166* (2013.01); *A61G 7/018* (2013.01); *H02K 3/28* (2013.01); *H02K 7/06* (2013.01);
(Continued)

(58) Field of Classification Search
CPC .................................................. H02K 7/1166
(Continued)

(56) References Cited

U.S. PATENT DOCUMENTS 7,935,901 B2    5/2011   Sorensen et al.
8,181,546 B2    5/2012   Larsen et al.
(Continued)

FOREIGN PATENT DOCUMENTS

EP    0 647 799    4/1995
EP    2 267 872    12/2010
(Continued)

OTHER PUBLICATIONS

Extended European Search Report issued Mar. 23, 2016 in European Application No. 13819261.2.
(Continued)

*Primary Examiner* — Hanh Nguyen
(74) *Attorney, Agent, or Firm* — Wenderoth, Lind & Ponack, L.L.P.

(57) ABSTRACT

[Problem] To reduce the size of a linear actuator motor without increasing the operating noise thereof, and to thereby achieve a quieter, more compact linear actuator. [Solution] A linear actuator including: a shaft that is rotated in the forward and reverse directions by a motor via a double start worm and a worm wheel; a screw nut that is screwed and mounted to the shaft; and a piston tube that is fixed to the screw nut and that advances or retreats in accordance with the rotation of the shaft. The motor includes: a four-pole magnet; an armature formed by lap winding an armature coil; a commutator; brushes that are vertically arranged at positions offset by approximately 90°; and an equalizer for connecting coils in the armature coil that are to undergo potential equalization.

4 Claims, 10 Drawing Sheets

(51) Int. Cl.
  *H02K 23/38* (2006.01)
  *H02K 7/06* (2006.01)
  *A61G 7/018* (2006.01)
  *H02K 3/28* (2006.01)
  *H02K 11/00* (2016.01)
  *H02K 13/10* (2006.01)

(52) U.S. Cl.
  CPC ......... *H02K 11/0094* (2013.01); *H02K 13/10* (2013.01); *H02K 23/38* (2013.01)

(58) Field of Classification Search
  USPC ...... 310/83, 68 R, 154.01–154.49, 15, 75 B, 310/12.32, 219, 224, 238, 248
  See application file for complete search history.

(56) References Cited

U.S. PATENT DOCUMENTS

| | | | | |
|---|---|---|---|---|
| 8,302,227 B2* | 11/2012 | Jensen | ................ | A47C 20/041 5/616 |
| 8,308,603 B2 | 11/2012 | Knudsen et al. | | |
| 2007/0018512 A1 | 1/2007 | Yasuda | | |
| 2007/0144281 A1 | 6/2007 | Inoue et al. | | |
| 2011/0018380 A1* | 1/2011 | Yoshida | ................ | H02K 5/148 310/154.21 |
| 2011/0018385 A1 | 1/2011 | Ishikawa et al. | | |
| 2012/0305346 A1* | 12/2012 | Wu | ................ | H02K 7/1166 188/134 |
| 2013/0162087 A1 | 6/2013 | Ishikawa et al. | | |
| 2013/0285494 A1* | 10/2013 | Iversen | ................ | F16H 25/20 310/83 |

FOREIGN PATENT DOCUMENTS

| | | |
|---|---|---|
| EP | 1 701 063 | 1/2014 |
| JP | 7-174204 | 7/1995 |
| JP | 2000-253618 | 9/2000 |
| JP | 2007-187279 | 7/2007 |
| JP | 2008-517570 | 5/2008 |
| JP | 2009-501503 | 1/2009 |
| JP | 2010-110137 | 5/2010 |
| JP | 2011-509381 | 3/2011 |
| WO | 2007/116788 | 10/2007 |

OTHER PUBLICATIONS

International Search Report (ISR) issued Oct. 1, 2013 in International (PCT) Application No. PCT/JP2013/068221.
English translation of the International Preliminary Report on Patentability and Written Opinion issued Jan. 29, 2015 in International (PCT) Application No. PCT/JP2013/068221.

* cited by examiner (a)

(b)

LINEAR ACTUATOR

TECHNICAL FIELD

The present invention relates to a linear actuator including a linear drive mode, and more particularly, a feed-screw type linear actuator that uses an electric motor having a four-pole, two-brush configuration.

BACKGROUND ART

In the medical/nursing care field, an electrically powered bed that is capable of inclining, raising, and lowering a back bottom or a knee bottom of the bed is widely used in order to reduce the burden of eating, sleeping, and the like on a patient or a person requiring care. In such an electrically powered bed, an electrically powered feed-screw type linear actuator is used because such a linear actuator is compact and is capable of obtaining a large drive force. For example, in Patent Document 1, a linear actuator is described, which is configured to cause a piston to extend and contract using a ball screw mechanism. In the linear actuator of Patent Document 1, the rotation of an electric motor is decreased and transmitted to a drive shaft by a worm and a worm wheel. The rotation of the drive shaft is converted into linear motion by the ball screw mechanism, which causes the piston to extend or contract. The linear actuator of Patent Document 1, which is used in the reclining of the back bottom of a bed, is connected to a link mechanism of the bed. When the piston of the actuator extends, the link mechanism expands, and the back bottom of the bed rises up to be in an inclined state (refer to FIG. 1(b)). Further, when the piston contracts, the link mechanism folds away, the back bottom is lowered into a horizontal position, and the bed shifts to a flat state (refer to FIG. 1(a)).

CITATION LIST

Patent Document

Patent Document 1: Jpn. Pat. Appln. Laid-Open Publication No. 2007-187279
Patent Document 2: Jpn. Pat. Appln. Laid-Open Publication No. 2008-517570
Patent Document 3: Jpn. Pat. Appln. Laid-Open Publication No. H07-174204
Patent Document 4: Jpn. Pat. Appln. Laid-Open Publication No. 2000-253618
Patent Document 5: Jpn. Pat. Appln. Laid-Open Publication No. 2011-509381
Patent Document 6: Jpn. Pat. Appln. Laid-Open Publication No. 2009-501503

SUMMARY OF THE INVENTION

Problems to be Solved by the Invention

On the other hand, there is always a need for a more compact, lighter linear actuator. In particular, in linear actuators used in electrically powered beds, a bed base is lowered from the standpoints of user convenience and safety, and thus there is a need for a lighter and thinner actuator to be arranged beneath the bottom. However, when the size of the motor is reduced, the output torque is reduced as a result. Consequently, in order to obtain the same drive force as before, a larger reduction ratio has to be set by increasing the rotation speed. However, to increase the reduction ratio, the number of teeth on the worm wheel in the reduction mechanism unit has to be increased. Therefore, there is a problem in that the outer diameter of the worm wheel is increased by the increase in the number of teeth, which is not suited to a lowering of the bed base. Further, when the rotation of the motor is increased, there is also a problem in that operating noise increases.

Further, although a reduction in size of the motor may be achieved by increasing the torque, in order to increase the torque of the motor, any one of the outer diameter and the axial length of the yoke has to be increased. However, increasing the outer diameter of the yoke results in an increase in the size of the motor, which is not suited to a lowering of the bed base. Further, increasing the axial length of the yoke results in an increase in the overall length of the actuator, which worsens the layout properties.

Thus, for a linear actuator, in particular, a linear actuator to be used in an electrically powered bed, there is a need for a compact motor capable of exhibiting high torque without increasing operating noise.

Means for Solving the Problems

According to one embodiment of the present invention, there is provided a linear actuator, including: a shaft including a male threaded portion; a worm and a worm wheel configured to slow down and transmit rotation of a motor to the shaft; a screw nut screwed to the male threaded portion and configured to advance and retreat based on forward and reverse rotation of the shaft; and a piston tube fixed to the screw nut and configured to advance and retreat with respect to a housing, the motor including: four field poles fixed to a yoke inner circumferential surface; an armature in which an armature winding is wound by lap winding; a commutator arranged on the armature and electrically connected to the armature winding; two brushes that are arranged at positions offset by approximately 90° and are in contact with a surface of the commutator; a plurality of coils connected to the commutator and configured to form the armature winding; and an equalizer configured to connect coils from among the plurality of coils that are to undergo potential equalization.

According to one embodiment of the present invention, for a feed-screw type linear actuator that uses an electric motor, a motor in which an armature winding is lap-wound, equipped with an equalizer, and having a four-pole, two-brush configuration, is employed as the drive source. Consequently, the size of the motor is reduced, which enables the size of the linear actuator to be reduced while exhibiting the same function as a related-art actuator.

In the above-mentioned linear actuator, the two brushes may be arranged in a manner in which brushes having different poles are in vertical positional relationship such as, for example, a positive pole at the top and a negative pole at the bottom. Consequently, even if brush abrasion powder is produced due to use over a long period of time, short circuiting between the brushes as a result of the brush abrasion powder can be prevented because the brush abrasion powder does not build up between the two brushes.

Further, as the above-mentioned worm, a multistart worm having two or more starts (e.g., a double start worm) may be used. Consequently, even if the number of revolutions of the worm is decreased, the same number of revolutions of the worm wheel as before can be ensured. Therefore, compared with when a single start worm is used, the number of revolutions of the motor can be decreased, and as a result the operating noise produced during motor operation can be accordingly suppressed.

Advantageous of the Invention

The linear actuator according to one embodiment of the present invention uses, as the motor serving as the drive source, a motor in which an armature winding is lap-wound and having a four-pole, two-brush configuration. Therefore, the motor is smaller than for a related-art linear actuator, which enables the size of the linear actuator to be reduced. Hence, for example, using this linear actuator in an electrically powered bed allows the base of the bed to be lower.

MODE FOR CARRYING OUT THE INVENTION

Figure 1:
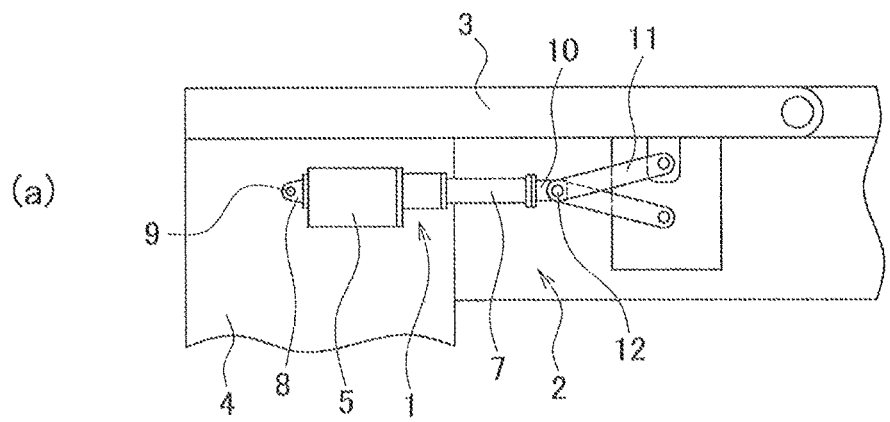
FIG. 1 An explanatory diagrams illustrating a state in which a linear actuator according to an embodiment of the present invention is in use.
Figure 1:
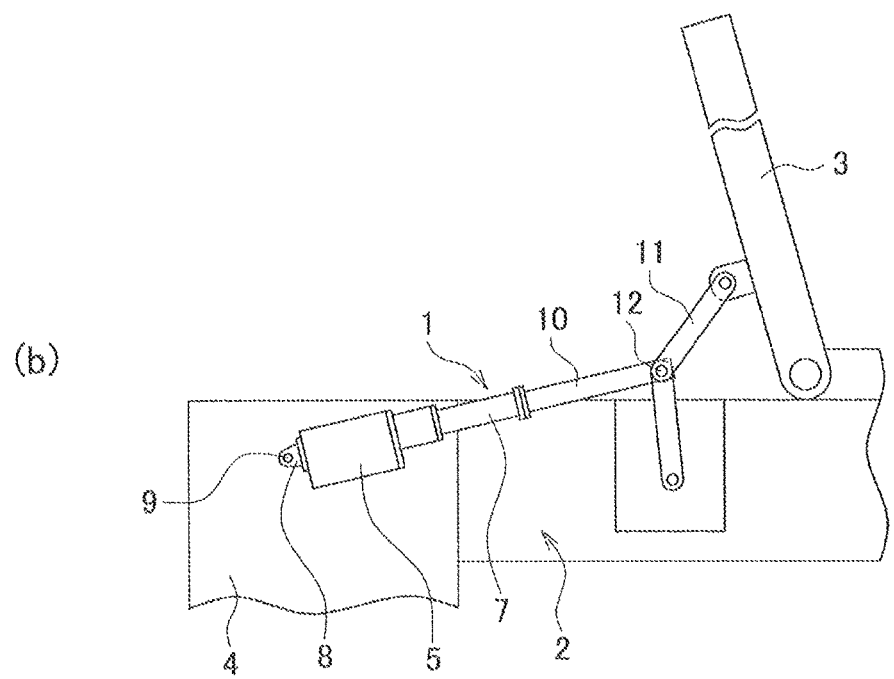
Figure 2:
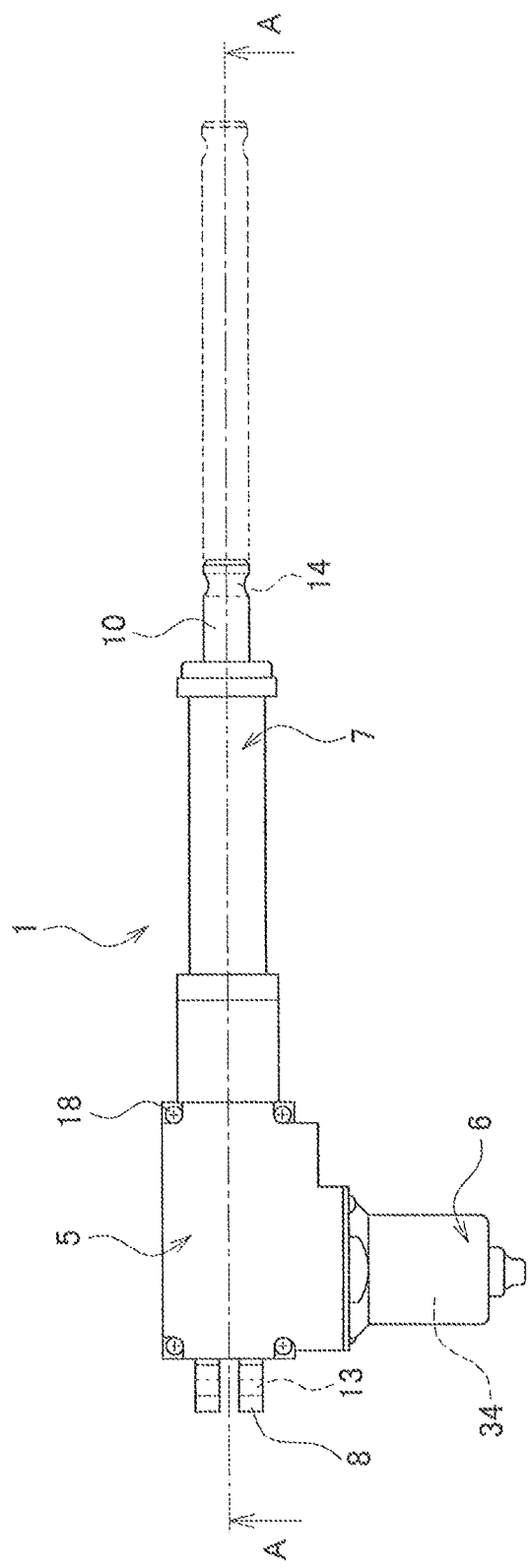
FIG. 2 A plan view illustrating the overall structure of the linear actuator of FIG. 1.
Figure 3:
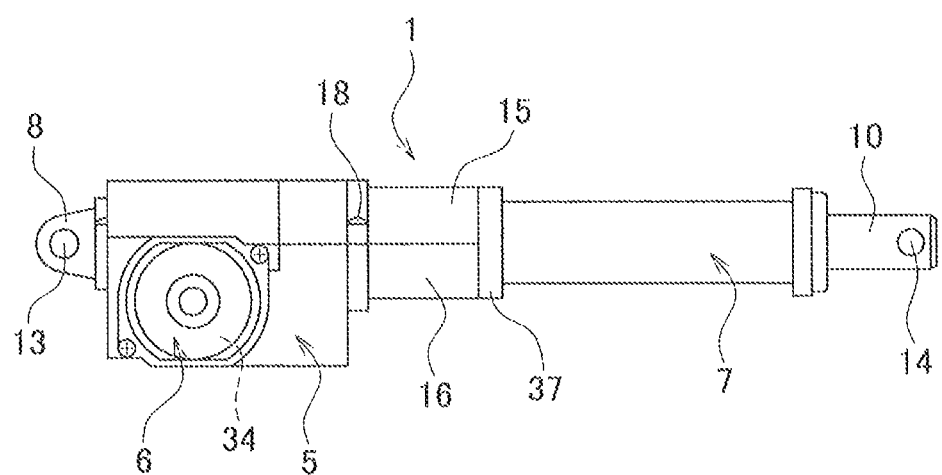
FIG. 3 A front view of the linear actuator of FIG. 1.
Figure 4:
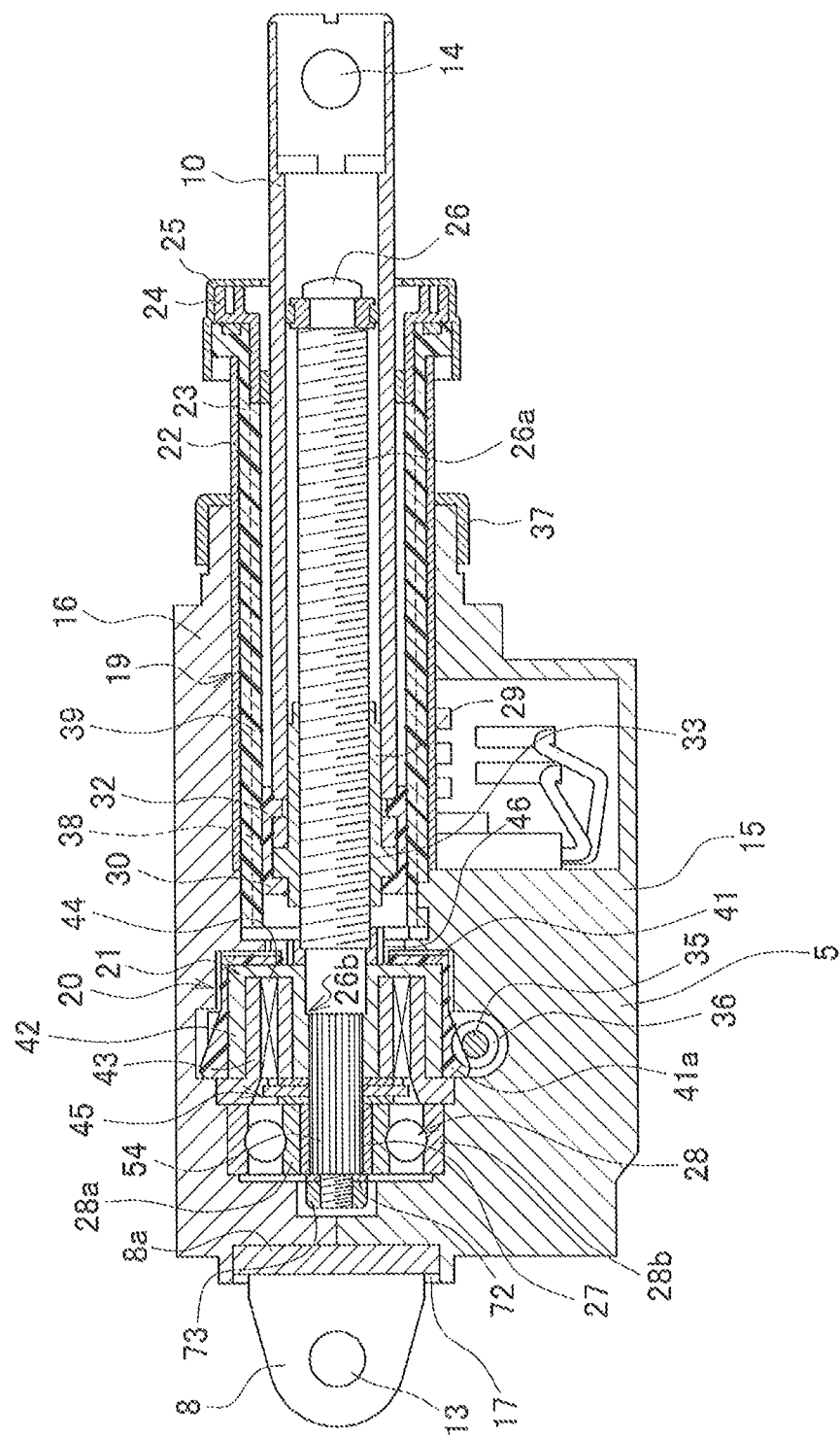
FIG. 4 An enlarged cross-sectional view taken along the line A-A in FIG. 2.

An embodiment of the present invention is described below in detail with reference to the drawings. It is an object of the embodiment to provide a linear actuator including a compact motor capable of exhibiting high torque. FIG. 1 are explanatory diagrams illustrating a state in which a linear actuator 1 according to the embodiment of the present invention is in use. FIG. 2 is a plan view illustrating the overall structure of the linear actuator 1. FIG. 3 is a front view of the linear actuator 1. FIG. 4 is an enlarged cross-sectional view taken along the line A-A in FIG. 2. The linear actuator 1 according to the present invention is a feed-screw type actuator that uses an electric motor. The linear actuator 1 is used as a drive source for raising and lowering a bed base (back bottom 3) of a back portion of a medical/nursing care bed 2 (hereinafter abbreviated as "bed 2"). The linear actuator 1 is mounted to a frame 4 of the bed 2, and is arranged beneath the bed.

As illustrated in FIG. 2, the linear actuator 1 includes a body housing 5, a motor unit 6, and a piston unit 7. As illustrated in FIG. 1, the linear actuator 1 is mounted to the bed 2 in a state in which the body housing 5 is on a fixed side and the piston unit 7 is on a free end side. The body housing 5 is mounted to the frame 4 via a clevis 8. The clevis 8 is mounted to the frame 4 in a manner that allows the clevis 8 to rotate about an actuator support shaft 9 (hereinafter abbreviated as "support shaft 9"). A piston tube 10 is mounted to the piston unit 7 in a manner that allows the piston tube 10 to protrude from and retract back into the piston unit 7. The piston tube 10 is connected to a link 11 for raising and lowering the back bottom 3. The piston tube 10 is mounted to the link 11 in a manner that allows the piston tube 10 to rotate about a link connection shaft 12.

As illustrated in FIG. 1(a), the bed 2 is configured so that, in a state in which the piston tube 10 has contracted, the back bottom 3 is lying horizontally. On the other hand, when the piston tube 10 is extended, as illustrated in FIG. 1(b), the back bottom 3 is in an erect state. The raised pitch of the back bottom 3 changes based on the extension amount of the piston tube 10. Appropriately controlling the linear actuator 1 allows the back bottom 3 to be stopped and held at an arbitrary angle. The user of the bed or a care worker may adjust the back bottom 3 to a desired angle by operating a switch (not shown).

As illustrated in FIGS. 2 and 3, the motor unit 6, which is the power source, is mounted to a side surface of the body housing 5. The piston unit 7 is mounted to the right end side of the body housing 5 as illustrated in the diagram. The clevis 8 is mounted to the left end side of the body housing 5 as illustrated in the diagram. A shaft hole 13 is provided in the clevis 8. The support shaft 9 is inserted into the shaft hole 13. The body housing 5 is rotatably mounted to the frame 4 by the clevis 8 and the support shaft 9. A shaft hole 14 is provided in a tip portion of the piston tube 10. The link connection shaft 12 is inserted into the shaft hole 14. The piston unit 7 is rotatably mounted to the link 11 by the link connection shaft 12.

The body housing 5 is formed in a rectangular cuboid shape. As illustrated in FIG. 3, the body housing 5 is split into two in an axial, direction. The upper side of the body housing 5 serves as a first case 15, and the lower side of the body housing 5 serves as a second case 16. The body housing 5 is configured by combining the first case 15 and the second case 16. The first case 15 and the second case 16 are both formed of synthetic resin. The first case 15 and the second case 16 are fastened by a screw 18. A metal frame ring 37 is mounted to a cylindrical portion of the first case 15 and the second case 16, which prevents the first case 15 and the second case 16 from separating. The clevis 8 is mounted to a clevis mounting portion 17 while sandwiched between the first case 15 and the second case 16. The clevis 8 includes a flange portion 8a formed into a square shape. The flange portion 8a is inserted and held in the clevis mounting portion 17. In the linear actuator 1, changing the mounting direction of the flange portion 8a allows the shaft hole 13 to be set in any one of a perpendicular direction and a horizontal direction, thereby increasing the level of mounting freedom.

As illustrated in FIG. 4, a piston unit housing portion 19 and a mechanism housing portion 20 are provided in the body housing 5. The left end side of the piston unit 7 is housed and fixed in the piston unit housing portion 19. The piston unit 7 includes a reinforcement pipe 22 made of metal, a support pipe 23 made of synthetic resin, and the piston tube 10. A power transmission mechanism 21 for transmitting rotational power from the motor unit 6 to the piston tube 10 is housed in the mechanism housing portion 20. The power transmission mechanism 21 includes a worm wheel 41, a coupling 42, a clutch case 43, a one-way clutch 44 (hereinafter abbreviated as "clutch 44"), and a brake unit 45.

The reinforcement pipe 22 of the piston unit 7 is formed into a cylindrical shape. One end of the reinforcement pipe 22 is supported and fixed in a state sandwiched between the first case 15 and the second case 16. The cylindrical support pipe 23 is inserted into the reinforcement pipe 22. On a tip portion of the support pipe 23, a plug 24 made of synthetic resin is mounted. A metal cap 25 is mounted to an external side of the plug 24. The cylindrically-formed piston tube 10 and a shaft 26 are housed in the support pipe 23. A bearing adapter 27 is mounted to the left end portion of the shaft 26. The shaft 26 is mounted to a bearing 28 via the bearing adapter 27. The bearing 28 is mounted to the body housing 5. The shaft 26 is rotatably supported by the bearing 28 in the body housing 5. A washer 72 and a nut 73 are mounted to the shaft 26 as a retainer of the bearing adapter 27.

A male threaded portion 26a is formed on the shaft 26. A screw nut 29 is mounted to the male threaded portion 26a. The length of the male threaded portion 26a is the same length as for a related-art actuator. Therefore, the linear actuator 1 is capable of exhibiting the same function (raising and lowering of the back bottom 3) as a related-art actuator. A female threaded portion 33 for engaging with the male threaded portion 26a is formed on an inner side of the screw nut 29. The screw nut 29 is screwed and mounted to the male threaded portion 26a of the shaft 26 in a manner that allows the screw nut 29 to advance and retreat.

Figure 5:
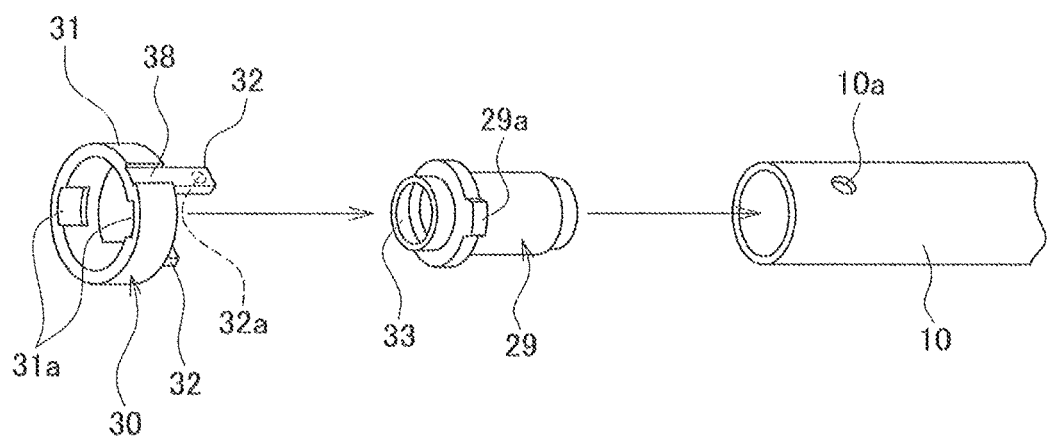
FIG. 5 An explanatory diagram illustrating a configuration for fixing a screw nut and a piston tube with a screw nut adapter.

As illustrated in FIG. 5, a screw nut adapter 30 (hereinafter abbreviated as "adapter 30") made of synthetic resin is mounted to the screw nut 29 in a state in which the screw nut adapter 30 is prevented from turning. Concave portions 31a are formed on an inner circumference of a ring portion 31 of the adapter 30. Corresponding to these portions, convex portions 29a are formed on an outer circumference of the screw nut 29. By fitting the convex portions 29a into the concave portions 31a, the adapter 30 is stopped from turning and is fixed to the left end portion of the screw nut 29 as illustrated in the diagram. A claw portion 32 is protrudingly formed in an axial direction on the adapter 30. A protrusion 32a that protrudes inwards in a radial direction is provided on the tip of the claw portion 32. Corresponding to this, a through hole 10a is formed on the end portion of the piston tube 10. By fitting the protrusion 32a into the through hole 10a, the screw nut 29 is connected to the piston tube 10 via the adapter 30 in a state in which the screw nut 29 is prevented from turning. A fitting groove 38 is formed in a base portion of the claw portion 32. A protruding portion 39 (not shown) that is formed on an inner circumference of the support pipe 23 and extends in an axial direction is fitted into the fitting groove 38. By fitting the protruding portion 39 into the fitting groove 38, the adapter 30 is movably arranged in the axial direction in a state in which the adapter 30 is prevented from turning in the support pipe 23.

Thus, with the linear actuator 1 according to the present invention, the piston tube 10 and the screw nut 29 are coupled by the adapter 30. Consequently, unlike a fastening structure using a screw and a pin like a related-art actuator, the screw and the like do not protrude from the screw nut end surface. Consequently, the distance between the screw nut 29 and the power transmission mechanism 21 (the worm wheel 41 etc.) may be shortened, which allows the length of the overall apparatus to be shortened. Therefore, with the linear actuator 1 according to the present invention, the piston stroke may be maintained at the same level as that of a related-art apparatus, while reducing the size of the apparatus.

With the rotation of the shaft 26, the screw nut 29 and the piston tube 10 integrally move in the axial direction. Here, rotation of the shaft 26 in the direction in which the piston tube 10 extends (advances) is referred to as "forward rotation", and rotation of the shaft 26 in the direction in which the piston tube 10 contracts (retreats) is referred to as "reverse rotation". Therefore, when the shaft 26 rotates in a forward direction, the piston tube 10 extends, and when the shaft 26 rotates in a reverse direction, the piston tube 10 contracts.

Figure 6:
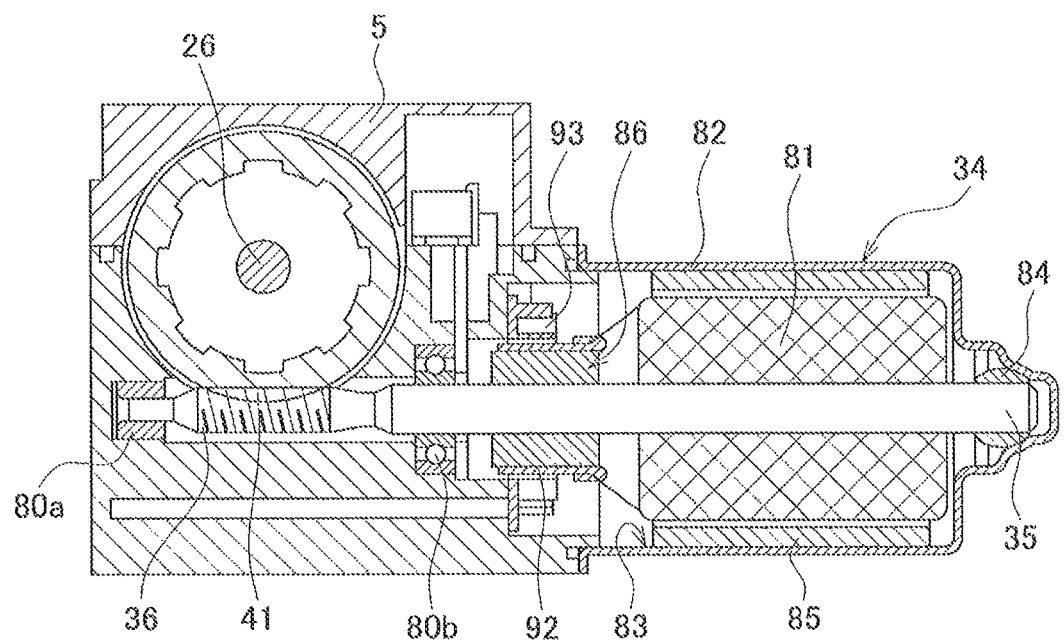
FIG. 6 A cross-sectional view illustrating a configuration of a motor unit.
Figure 7:
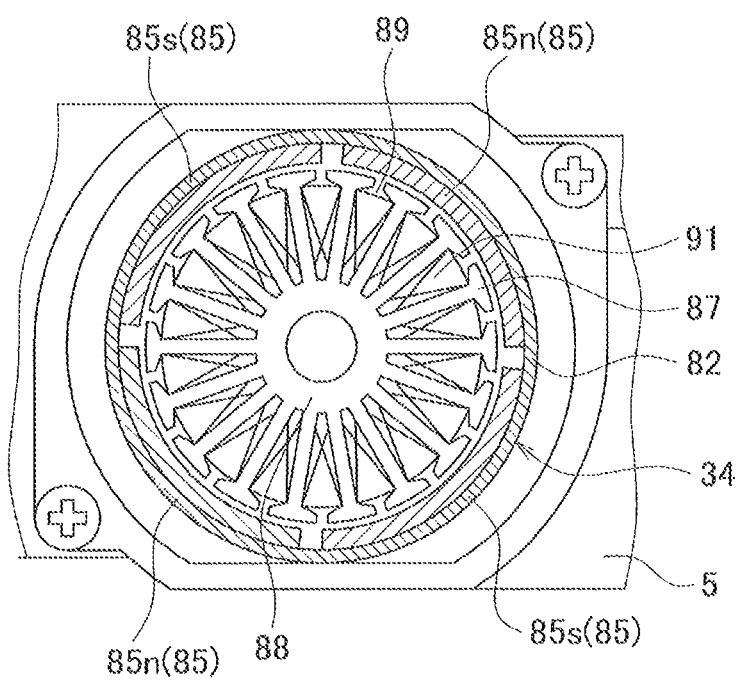
FIG. 7 An explanatory diagram illustrating a configuration of a motor.
Figure 8:
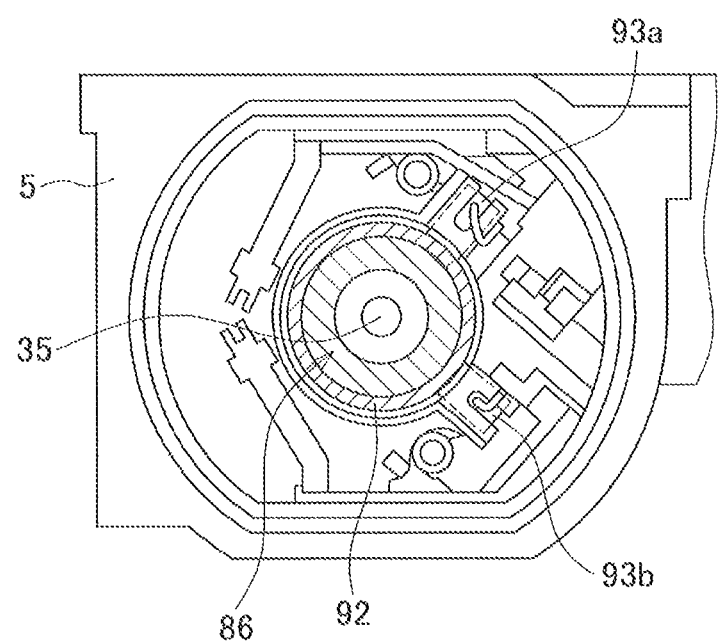
FIG. 8 An explanatory diagram illustrating a configuration of the motor.

The motor unit 6, which includes a motor 34, is mounted to a side surface of the body housing 5. FIG. 6 is a cross-sectional view illustrating the configuration of the motor unit 6. FIGS. 7 and 8 are explanatory diagrams illustrating the configuration of the motor 34. As illustrated in FIG. 6, a rotary shaft 35 of the motor 34 is inserted into the body housing 5, and extends into the mechanism housing portion 20. The rotary shaft 35 is rotatably supported by bearings 80a and 80b provided in the first case 15. A worm 36 is formed on the outer circumference of the rotary shaft 35. The worm 36 engages with the worm wheel 41 of the power transmission mechanism 21. In the linear actuator 1, a multistart worm having two or more starts is used for the worm 36 (here, a double start worm is used). By using a multistart worm for the worm 36, it is possible to ensure the number of revolutions of the worm wheel 41 even if the number of revolutions of the worm 36 is reduced. Therefore, compared with using a single start worm, the number of revolutions of the motor may be reduced, which allows the operating noise that is produced during motor operation to be accordingly suppressed.

The motor 34 includes an armature 81, which includes the rotary shaft 35, and a bottomed cylindrical yoke 82. The armature 81 is housed in the yoke 82. A bearing 84 is mounted to the end portion of the yoke 82. One end side of the rotary shaft 35 is rotatably supported on the bearing 84. As illustrated in FIG. 7, four magnets 85 in two pairs are mounted to an inner circumference surface 83 of the yoke 82 as field poles. The magnets 85 are arranged on the inner circumference side so that magnets 85n magnetized to an N-pole and magnets 85s magnetized to an S-pole alternate. The magnets 85n and 85s are fixed to the yoke inner circumference surface 83 by an adhesive or the like.

The motor 34 has a four-pole configuration including the four magnets 85. The four-pole motor 34 is capable of ensuring the motor torque that is required as an actuator even if the magnets are thinner than those for a related-art motor having a 2-pole configuration. Therefore, making the magnets 85 thinner also allows the external diameter of the yoke 82 to be reduced, which in turn allows the size of the motor 34 to be reduced. As described above, for an electrically powered bed, a lower bed base is needed. For the bed 2, the reduction in the size of the motor enables the size of the linear actuator to be reduced, so that the size of the space beneath the bed bottom can be reduced further. Consequently, it is possible to arrange the bed bottom at an even lower position (a lower bed base can be achieved). Further, by designing the motor 34 to have a four-pole configuration, cogging of the motor 34 is decreased, and the actuator operating noise is also reduced.

The armature 81 is arranged on an inner side of the magnets 85. A commutator 86 is mounted to the rotary shaft 35 adjacent to the armature 81. The armature 81 includes an armature core 88. As illustrated in FIG. 7, the armature core 88 includes eighteen teeth 87 radially extending along the radial direction. Slots 89 are formed between the teeth 87. An armature coil (armature winding) 91 is wound in the slots 89. The armature coil 91 is wound in the slots 89 with a predetermined interval therebetween. Each of the end portions of the armature coil 91 is electrically connected to each commutator piece 92 of the commutator 86. Brushes 93 (93a and 93b) are in slidable contact with the commutator 86.

Figure 9:
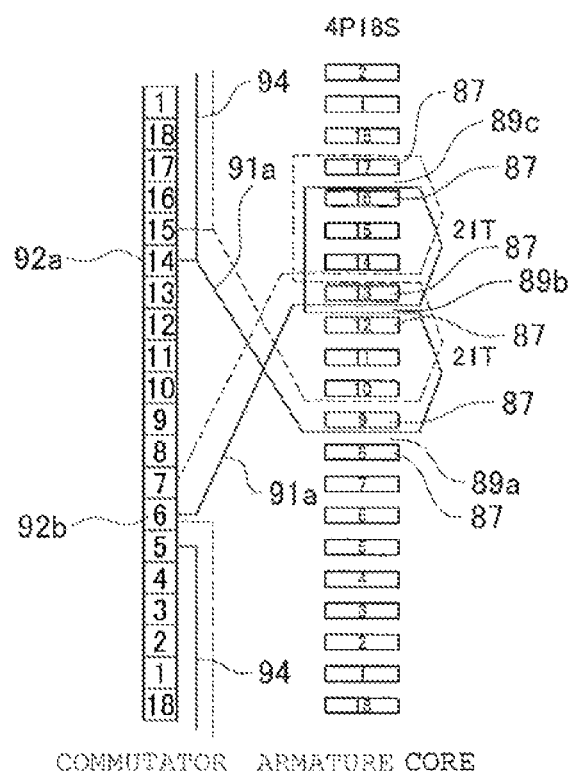
FIG. 9 An explanatory diagram illustrating a winding state of an armature coil.

FIG. 9 is an explanatory diagram illustrating a winding state of the armature coil 91. As illustrated in FIG. 9, the armature coil 91 is, from the commutator piece 92, wound a predetermined number of times between two slots 89 with a predetermined interval therebetween, and then further wound a predetermined number of times between two slots 89 with a predetermined interval therebetween. Then, the armature coil 91 is connected to another commutator piece 92. For example, a coil 91a in FIG. 9 is wound by, from a fourteenth commutator piece 92a, first placing the coil 91a in a slot 89a formed between the eighth and ninth teeth 87, and then winding a predetermined number of times (e.g., 21 turns) between the slot 89a and a slot 89b formed between the twelfth and thirteenth teeth 87. Next, the coil 91a is wound a predetermined number of times (e.g., 21 turns) between the slot 89b and a slot 89c formed between the sixteenth and seventeenth teeth 87. Then, after a predetermined turn, the coil 91a is connected from the slot 89b to a sixth commutator piece 92b.

By employing a winding method like that described above, the thickly wound portion of the lap-wound coil has half the number of turns. In other words, in the example described above, a thickly wound portion having 42 turns is formed from 21×2 turns, which enables the coil to be wound to the far reaches of the slots. Consequently, an increase in the size of the coil end portions may be suppressed, and as a result, a coil space factor of the winding may be increased.

Further, in the armature coil 91, isopotential points are connected by an equalizer 94. In other words, opposing coils having the same electric potential of the armature coil 91 are connected by the equalizer 94. That is, in this motor 34 having 18 slots, coils that are 9 slots apart and are positioned opposing each other by 180 are connected by the equalizer 94. Consequently, power is supplied via the equalizer 94 to opposing coils having the same electric potential, which allows brushes having the same electric potential that are positioned opposing the brushes 93a and 93b to be omitted (indicated by the dotted line in FIG. 8). In the linear actuator 1, the equalizer 94 allows the motor 34 to have a four-pole, two-brush configuration. Compared with a related-art motor having a two-pole, two-brush configuration, the size of the motor 34 may be reduced by having a four-pole motor without worsening the brush sliding noise.

Thus, with the linear actuator 1 according to the present invention, employing a four-pole configuration enables the size of the motor 34 to be reduced and the base of the bed to be further lowered. Further, the quietness of the linear actuator 1 is also improved, because the motor 34 is quieter than a related-art motor as a result of the reduction in the operating noise due to the employment of a multistart worm and the reduction in cogging due to the employment of four poles. In addition, with the improvement in the quietness of the linear actuator 1, the actuator operating noise does not have an impact below the bottom even if the bed bottom is lowered more than in the related art. Consequently, the bed bottom may be arranged even lower, which in turn allows lowering of the bed base.

On the other hand, with the linear actuator 1 according to the present invention, as illustrated in FIG. 8, the two brushes 93a and 93b are vertically (the perpendicular direction with respect to the floor) arranged at positions offset by 90°. The brush 93a on the upper side (bed bottom side) has the positive (+) pole, and the brush 93b on the lower side (floor side) has the negative (−) pole. In other words, in the linear actuator 1, brushes having different poles are arranged vertically. Generally, in a brushed motor, along with the operation of the motor, brush abrasion powder is produced by the sliding contact of the commutator with the brushes, and this brush abrasion powder can accumulate in the motor due to use over a long period of time. If brushes having different poles are arranged horizontally, the brush abrasion powder can build up between the brushes and cause the brushes to short circuit. However, with the motor 34, brush abrasion powder does not build up between the brushes even if brush abrasion powder accumulates in the motor because the brushes 93a and 93b are arranged in the vertical direction. Therefore, even if brush abrasion powder is produced due to use over a long period, there is no risk of short circuiting between the brushes as a result of that. Consequently, the reliability of the motor 34 is improved, and the reliability of the linear actuator 1 as well as the bed 2 is also improved.

Figure 10:
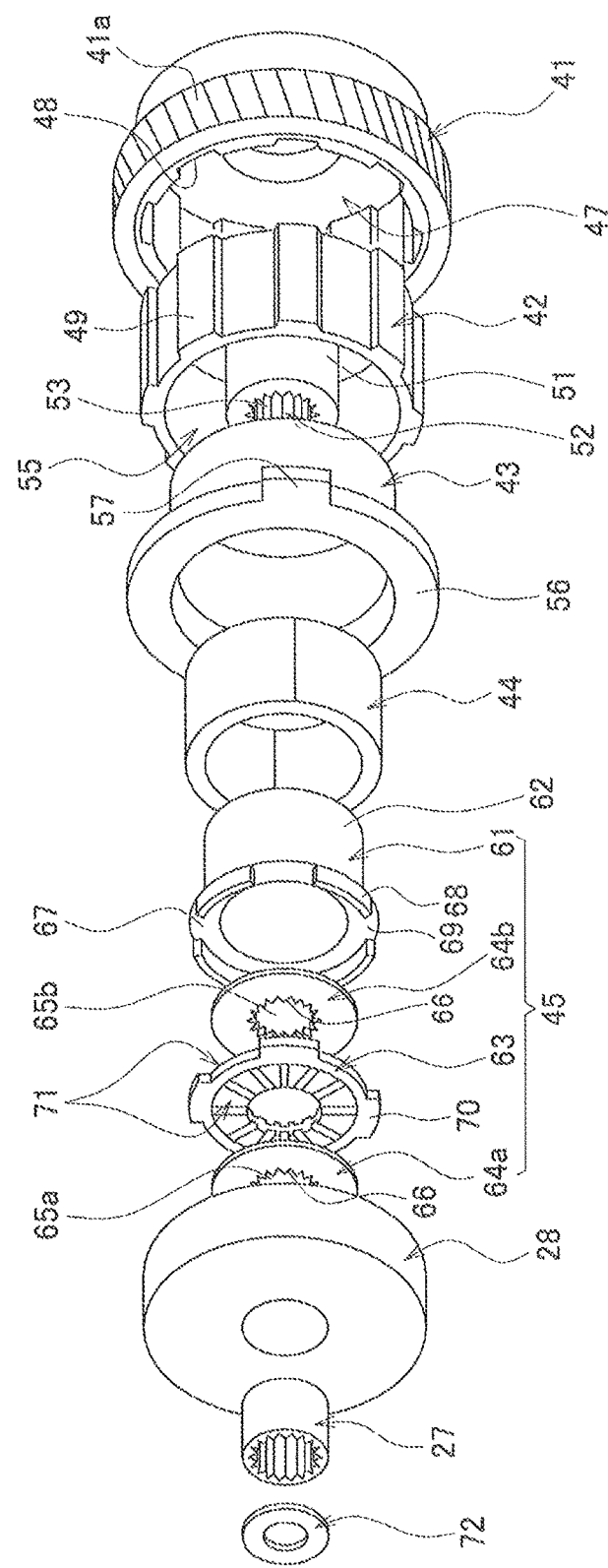
FIG. 10 An exploded perspective view illustrating a configuration of a power transmission mechanism.

FIG. 10 is an exploded perspective view illustrating a configuration of the power transmission mechanism 21. As stated above, the power transmission mechanism 21 is configured from the worm wheel 41, the coupling 42, the clutch case 43, the clutch 44, and the brake unit 45. In the power transmission mechanism 21, rotational input from the worm 36 is transmitted to the shaft 26 from the worm wheel 41 via the coupling 42. When the shaft 26 is rotated in a forward direction, the piston tube 10 is pushed out, and the back bottom 3 is raised. At this stage, the clutch 44 in the power transmission mechanism 21 is in a free state (an OFF state). Consequently, the piston tube 10 advances without causing a braking action by the brake unit 45.

On the other hand, when the shaft 26 is rotated in reverse, the piston tube 10 is pulled in, and the back bottom 3 is lowered. In the case of reverse rotation, unlike during forward rotation, the clutch 44 is in a locked state (an ON state). In other words, the rotation of the shaft 26 is transmitted to the members in the brake unit 45, and a braking action is produced. Consequently, the piston tube 10 retreats with the braking action. This braking action can prevent an acceleration in the movement of the back bottom 3 when the back bottom 3 is being horizontally lowered (when the piston is contracting) due to the weight of the back bottom 3 and the weight of the user (hereinafter abbreviated as "weight of the user etc."). Further, when the back bottom 3 is stopped in an inclined state by turning off the motor 34, the back bottom 3 can be prevented from collapsing due to the weight of the user etc.

As illustrated in FIGS. 4 and 10, the worm wheel 41 is formed into a bottomed cylindrical shape. One end side of the worm wheel 41 has a cup-shaped opening. A small gear 46 is formed on the other end side of the worm wheel 41. The small gear 46 is connected to a potentiometer sensor (not shown) for detecting rotation via a reduction gear (not shown) and the like. The opening end side of the worm wheel 41 serves as a cylindrical hole-shaped coupling fitting portion 47. A plurality of fitting concave portions 48 are equally formed along the circumferential direction on the inner circumferential portion of the coupling fitting portion 47. The coupling 42 made of metal (e.g., an iron-sintered alloy) is mounted to the coupling fitting portion 47 in an inserted state. The clutch case 43 and the clutch 44 are housed in the coupling 42.

For the linear actuator 1, a configuration in which the worm wheel 41 has a cup-like shape and the clutch 44 and the like are housed therein is employed. Based on this configuration, compared with a related-art actuator like that illustrated in FIG. 10, in which the worm wheel 41 and the clutch 44 are arranged in series in the axial direction, the length of the overall apparatus may be shortened. Therefore, as described above, the piston stroke may be ensured while reducing the size of the apparatus.

The coupling 42 is also formed into a bottomed cylindrical shape. A plurality of fitting convex portions 49 are equally formed along the circumferential direction on the outer circumferential portion of the coupling 42. The fitting convex portions 49 are capable of being inserted and fitted into the fitting concave portions 48 in the axial direction. When the coupling 42 is mounted to the coupling fitting portion 47, the fitting convex portions 49 fit into the fitting concave portions 48. Due to the fitting of the fitting convex portions 49 into the fitting concave portions 48, the coupling 42 is mounted on the worm wheel 41 in a state in which the coupling 42 is prevented from turning.

A boss portion 51 is protrudingly formed on the inner circumference side of the coupling 42. A shaft hole 52 is formed in the boss portion 51 so as to penetrate through the boss portion 51 in the axial direction. Serrations 53 are formed on the inner circumferential surface of the shaft hole 52. As illustrated in FIG. 4, serrations 54 are also formed on the outer circumference on the left end side of the shaft 26. The coupling 42 is mounted to the shaft 26 in a state in which both the serrations 53 and 54 are engaged. Due to the engagement of the serrations 53 and 54, the coupling 42 is mounted to the shaft 26 in a state in which the coupling 42 is prevented from turning. Consequently, the worm wheel 41 is integrated with the shaft 26 via the coupling 42.

In the linear actuator 1 according to the present invention, the metal coupling 42 is arranged in between the worm wheel 41 and the shaft 26, and the rotation force of the worm wheel is transmitted to the shaft 26 via the coupling 42. Consequently, the strength of the worm wheel 41 may be ensured by the coupling 42, which allows the thickness (length in the axial direction) of the worm wheel 41 to be thinner. In a related-art actuator, because a worm wheel made of synthetic resin and a shaft made of metal are joined in a serrated manner, the joining portion needs to be longer in order to ensure the coupling strength. In contrast, with the linear actuator 1 according to the present invention, because the coupling 42 and the shaft 26, which are both made of metal, are serration-connected each other, the joining portion may be shorter than in the related art, and consequently, the overall length of the apparatus may be shortened. Therefore, with the linear actuator 1 according to the present invention, the piston stroke may also be ensured while reducing the size of the apparatus.

Further, by arranging the coupling 42 in the worm wheel 41, an inner side of a teeth portion 41a of the worm wheel 41 is strengthened by a metal member. Consequently, the strength of the teeth portion 41a may be ensured even without increasing the outer diameter of the worm wheel 41, which allows the diameter of the worm wheel 41 to be reduced and the thickness of the apparatus to be decreased. Generally, because linear actuators that are used for a bed are arranged beneath the bed, such linear actuators also need to be a thin apparatus in order to accommodate lowering of the bed base. The linear actuator 1 according to the present invention is capable of meeting such demands that are associated with the lowering of the bed base.

In addition, for a related-art actuator, because a worm wheel formed entirely from synthetic resin is used, when the axial direction length is shortened, not only is the joining strength with the shaft reduced, but the worm wheel is deformed by the engagement with the gear teeth, which can cause the degree of engagement to decrease. When the degree of engagement decreases, problems arise such as abnormal noise being produced during operation, and an increase in abrasion of the teeth portion. Regarding this point, with the linear actuator 1, because a metal member is arranged on the inner side, the worm wheel is less susceptible to deformation, and the engagement between the worm 36 and the worm wheel 41 is also stable. Therefore, abnormal noise during operation and abnormal abrasion are suppressed, enabling an improvement in feeling when using the bed and an improvement in the durability of the actuator.

The clutch case 43, which is made of metal (e.g., made by aluminum die casting), is inserted into an inner cylindrical portion 55 of the coupling 42. The clutch case 43 has a cylindrical shape, in which both ends are open. A flange-shaped ring portion 56 is formed with an enlarged diameter on one end side of the clutch case 43. A protruding portion 57 is formed on the outer circumference of the ring portion 56 so as to protrude toward the external side in the radial direction. The protruding portion 57 latches with a latching portion (not shown) (concave portion) provided on the first case 15. The protruding portion 57 is arranged so as to be prevented from turning with respect to the first case 15. The outer circumference (outer race side) of the clutch 44 is fixed by press fitting to the inner side of the clutch case 43. A one-way clutch including a plurality of rollers (not shown) is used for the clutch 44. The clutch 44 transmits rotation only in one direction from one to the other between the inner and outer races. When the shaft 26 is rotating in a forward direction, the clutch 44 is in a free state, and when the shaft 26 is rotating in reverse, the clutch 44 is in a locked state.

A cylindrical portion 62 of a brake plate holder 61 provided in the brake unit 45 is inserted on the inner circumferential side (inner race side) of the clutch 44. The cylindrical portion 62 is a member that is arranged, with the boss portion 51 of the coupling 42, between the clutch inner race and the shaft 26. The clutch 44 is arranged on the shaft 26 via the boss portion 51 and the cylindrical portion 62. In the linear actuator 1, adjusting the diameter of the boss portion 51 and the cylindrical portion 62 enables the size of the clutch 44 to be changed, which allows the clutch 44 to be selected based on the desired locking force.

The brake unit 45 is configured from the brake plate holder 61 made of metal, a brake plate 63 made of synthetic resin (e.g., polyamide), and brake washers 64a and 64b (two washers) made of metal. Serrations 66 are formed on shaft holes 65a and 65b of the brake washers 64a and 64b. The serrations 66 engage with the serrations 54 of the shaft 26. Due to the engagement of the serrations 66 and 54, the brake washers 64a and 64b are mounted to the shaft 26 in a state in which the brake washers 64a and 64b are prevented from turning. The brake washers 64a and 64b are arranged on both sides in the axial direction of the brake plate 63 so as to sandwich the brake plate 63.

The brake plate holder 61 has a cylindrical shape, in which both ends are open. A flange portion 67 is formed on one end side of the brake plate holder 61. Four convex portions 68 are provided at equal intervals along the axial direction on the flange portion 67. The space between the convex portions 68 serves as a holder concave portion 69. Four plate convex portions 70 formed on the outer circumference of the brake plate 63 are fitted into the holder concave portions 69. Due to the fitting of the convex portions 70 into the concave portions 69, the brake plate 63 and the brake plate holder 61 integrally rotate. Press-contact portions 71 having an uneven shape are formed at both end surfaces of the brake plate 63. The press-contact portions 71 are brought into press-contact in a slidable state with the brake washers 64a and 64b. Grease is applied between the brake washers 64a and 64b and the press-contact portions 71 in order to prevent abnormal noise caused by the sliding of different materials.

In the brake unit 45, when the shaft 26 is rotating in a forward direction, the clutch 44 is set so as to be in a free state. In the brake unit 45, the brake washers 64a and 64b rotate with the shaft 26. When the brake washers 64a and 64b rotate, the brake plate 63 is also caused to rotate due to the frictional force produced by the press-contact portions 71. The brake plate 63 and the brake plate holder 61 integrally rotate due to the fitting of the plate convex portions 70 into the holder concave portions 69. At that time, because the brake unit 45 sets the clutch in a free state when the shaft is rotated in a forward direction, the brake plate holder 61 is in an idle state in the clutch 44. In other words, the rotation of the brake plate holder 61 is not transmitted to the clutch case 43 side, and the whole brake unit 45 is idling in the clutch case 43. Therefore, when the shaft 26 is rotated in a forward direction, the brake plate holder 61 and the brake plate 63 rotate in a forward direction, and the brake washers 64a and 64b and a bearing inner race 28a also rotate in a forward direction. Consequently, a braking action is not produced by the brake unit 45.

In contrast, when the shaft 26 is rotated in reverse, the clutch 44 is in a locked state. In other words, the rotation of the brake plate holder 61 is transmitted to the clutch case 43 side, and the clutch case 43 tries to rotate. However, as described above, because the clutch case 43 is arranged in the first case 15 in a state in which the clutch case 43 is prevented from turning, the clutch case 43 itself does not rotate. In other words, in response to the rotation of the shaft 26, the clutch case 43 to which the rotational force is transmitted via the clutch 44 is in a non-rotating state. Consequently, a slip occurs between the brake plate 63 and the brake washers 64a and 64b joined by the frictional force, and a rotational resistance force is produced by the frictional force of the press-contact portions 71. In other words, when the shaft 26 is rotated in reverse, although the brake plate holder 61 and the brake plate 63 are in a non-rotating state, the brake washers 64a and 64b and the bearing inner race 28a are rotating in reverse. Therefore, during reverse rotation, a braking action (braking force) is produced on the brake unit 45 due to the frictional force of the press-contact portions 71.

Note that, in the linear actuator 1, the shaft 26 and the clutch 44 are not joined directly, but the brake plate holder 61 is arranged on the inner side of the clutch 44. The boss portion 51 of the coupling 42 is arranged on the inner side of the brake plate holder 61. The shaft 26 is arranged on the inner side of the boss portion 51 of the coupling 42. Generally, in a one-way clutch, a larger clutch diameter exhibits a larger locking force. Therefore, when the clutch is directly mounted to the shaft like in a related-art actuator, the clutch diameter is reduced, which may cause the locking force to be insufficient. In contrast, with the linear actuator 1 according to the present invention, because other interposing members are arranged between the shaft 26 and the clutch 44, the size of the clutch 44 may be adjusted regardless of the shaft diameter. Consequently, the clutch 44 can be selected based on the desired locking force, so that the degree of design freedom increases and product reliability also improves.

Next, operation of the linear actuator 1 according to the present invention is described. In the linear actuator 1, when an operation button is pressed by the operator in order to raise the back bottom 3, the motor 34 rotates in a forward direction. The rotation of the motor 34 is transmitted from the worm 36 to the worm wheel 41 and the coupling 42, and the shaft 26 rotates in a forward direction. When the shaft 26 is rotated in a forward direction, the screw nut 29 advances, which causes the piston tube 10 coupled to the screw nut 29 to be pushed forward. With the advance of the piston tube 10, the back bottom 3 is raised to an erect state, as illustrated in FIG. 1(*b*). Note that, during forward rotation, because the clutch 44 is in a free state, only the shaft 26 is rotated in a forward direction, but a braking action is not produced by the brake unit 45.

Further, the forward rotation of the shaft 26 is transmitted from the small gear 46 to the potentiometer sensor for detecting rotation. The potentiometer sensor outputs a voltage value based on the angle of rotation of the shaft 26, and the output voltage value is transmitted to a controller (not shown) configured to control operation of the bed 2. The controller is configured to automatically stop the motor 34 when a potentiometer voltage corresponding to a predetermined upper limit position is detected.

When the motor 34 stops, the load (weight of the user etc.) of the back bottom 3 acts on the piston tube 10, and thus a force in the direction causing the screw nut 29 to retreat is also applied on the screw nut 29. This force in the retreating direction is a force that causes the shaft 26 to rotate in reverse, so the shaft 26 is rotated in reverse by the load of the back bottom 3. On the other hand, when the shaft 26 is rotated in reverse, the clutch 44 is in a locked state, and a braking action is produced on the brake unit 45. In other words, the brake washers 64a and 64b are rotated with respect to the brake plate 63 while still being subjected to the load, and a braking force is produced by the frictional force of the press-contact portions 71. Consequently, the reverse rotation of the shaft 26 is inhibited, and the back bottom 3 is held at rest while still being subjected to the load.

As illustrated in FIGS. 4 and 5, in the linear actuator 1, the bearing 28 is arranged between the nut 73 and the brake washer 64a. Further, due to the use of the bearing adapter 27, a deep groove ball bearing that has a large size capable of receiving the thrust load from the shaft 26 is used for the bearing 28. Therefore, in the linear actuator 1 according to the present invention, the force in the axial direction that is applied on the shaft 26 can be received by the inner race 28a of the bearing 28. In other words, in the linear actuator 1, the force in the axial direction applied on the shaft 26 is transmitted from a step portion 26b of the shaft 26 to the coupling 42, the brake washer 64b, the brake plate 63, the brake washer 64a, and then the inner race 28a of the bearing 28. Consequently, in the linear actuator 1, the base plate used for receiving a load that is used in a related-art actuator may be omitted, allowing the length of the overall apparatus to be shortened by the thickness of that base plate.

Further, in the linear actuator 1, the structure that rotates with the shaft 26 is the inner race 28a of the bearing 28. An outer race 28b does not rotate. Therefore, the occurrence of abnormal noise produced by the bearing outer race 28b sliding against the first case 15 can be prevented. In a related-art actuator, grease is applied between the bearing outer race and the body housing in order to prevent the occurrence of abnormal noise caused by rotation of the bearing outer race. However, with the actuator according to the present invention, because the outer race 28b of the bearing 28 does not rotate, the occurrence of abnormal noise is suppressed without needing to apply grease between the bearing outer race 28b and the body housing 5.

On the other hand, when the operation button is pressed by the operator in order to lower the back bottom 3, the motor 34 is rotated in reverse. The rotation of the motor 34 is transmitted in the same manner as described above, causing the shaft 26 to rotate in reverse. When the shaft 26 is rotated in reverse, the screw nut 29 retreats, causing the piston tube 10 to be pulled back in. With the retreat of the piston tube 10, the back bottom 3 shifts to a lowered state like that illustrated in FIG. 1(*a*). Further, the reverse rotation of the shaft 26 is also transmitted from the small gear 46 to the potentiometer sensor for detecting rotation, and the position of the piston tube 10 is detected. The controller is configured to automatically stop the motor 34 when a potentiometer voltage corresponding to a predetermined lower limit position, or a potentiometer voltage corresponding to a predetermined upper limit position, is detected.

During a reverse rotation operation, the clutch 44 is in a locked state, and the rotation of the shaft 26 is transmitted to the clutch case 43 side. As described above, at the brake unit 45 during a reverse rotation operation, a slip occurs at the press-contact portions 71, and a braking force is produced by that frictional force. However, this braking force is set to be smaller than the drive force of the shaft 26 by the motor 34. The shaft 26 rotates in reverse while being subjected to the braking force by the brake unit 45. Further, the back bottom 3 is lowered along with the contraction of the piston tube 10. When the back bottom 3 is lowered, because the above-mentioned braking force acts on the shaft 26, an acceleration in the lowering operation caused by the weight of the user etc. can be prevented, and the safety of the operation can be ensured.

Thus, the linear actuator 1, which is configured to shorten the distance (length of the parts configuring the actuator) between the respective members, is capable of shortening the overall length of the actuator without shortening the piston stroke. Therefore, as described above, the piston stroke can be ensured while reducing the size of the apparatus. Further, because the respective functional components are themselves not smaller, there is no reduction in component strength or in the thrust of the actuator. Therefore, the same function as a related-art actuator can be obtained while reducing the size of the apparatus. In addition, as a result of the reduction in size of the apparatus, the degree of freedom in the mounting layout to the bed is also improved.

The present invention is not limited to the above-mentioned embodiment, and naturally various modifications may be made to the present invention without departing from the spirit and scope thereof.

For example, the bed 2 is not limited to a so-called push-type configuration in which the back bottom 3 is raised by the extension of the piston tube 10 of the linear actuator 1, but the bed 2 may be a so-called pull-type configuration in which the back bottom 3 is raised by the shortening of the piston tube 10. Further, in the above-mentioned embodiment, although a case is described in which the linear actuator 1 is used to drive the back bottom 3, the linear actuator 1 may also be used to drive a knee bottom. In addition, the linear actuator 1 can also be used to adjust the height of the bed bottom.

INDUSTRIAL APPLICABILITY

In the above-mentioned embodiment, an example is described in which the linear actuator according to the present invention is used in an operation unit for a medical/nursing care bed. However, the linear actuator according to the present invention is not limited to being applied in a bed, the linear actuator may be widely applied in various mechanical devices and apparatus including an actuation site, such as other medical devices, automobiles, and household electric appliances.

| Reference Signs List | |
|---|---|
| 1: linear actuator | 2: medical/nursing care bed |
| 3: back bottom | 4: frame |
| 5: body housing | 6: motor unit |
| 7: piston unit | 8: clevis |
| 8a: flange portion | 9: actuator support shaft |
| 10: piston tube | 10a: through hole |
| 11: link | 12: link connection shaft |
| 13: shaft hole | 14: shaft hole |
| 15: first case | 16: second case |
| 17: clevis mounting portion | 18: screw |
| 19: piston unit housing portion | 20: mechanism housing portion |
| 21: power transmission mechanism | 22: reinforcement pipe |
| 23: support pipe | 24: plug |
| 25: cap | 26: shaft |
| 26a: male threaded portion | 26b: step portion |
| 27: bearing adapter | 28: bearing |
| 28a: inner race | 28b: outer race |
| 29: screw nut | 29a: convex portion |
| 30: screw nut adapter | 31: ring portion |
| 31a: concave portion | 32: claw portion |
| 32a: protrusion | 33: female threaded portion |
| 34: motor | 35: rotary shaft |
| 36: worm | 37: frame ring |
| 38: fitting groove | 39: protruding portion |
| 41: worm wheel | 41a: teeth portion |
| 42: coupling | 43: clutch case |
| 44: one-way clutch | 45: brake unit |
| 46: small gear | 47: coupling fitting portion |
| 48: fitting concave portion | 49: fitting convex portion |
| 51: boss portion | 52: shaft hole |
| 53: serration | 54: serration |
| 55: inner cylindrical portion | 56: ring portion |
| 57: protruding portion | 61: brake plate holder |
| 62: cylindrical portion | 63: brake plate |
| 64a, 64b: brake washer | 65a, 65b: shaft hole |
| 66: serration | 67: flange portion |
| 68: convex portion | 69: holder concave portion |
| 70: plate convex portion | 71: press-contact portion |
| 72: washer | 73: nut |
| 80a, 80b: bearing | 81: armature |
| 82: yoke | 83: yoke inner circumference surface |
| 84: bearing | 85: magnet |
| 85n: N-pole magnet | 85s: S-pole magnet |
| 86: commutator | 87: teeth |
| 88: armature core | 89: slot |
| 89a, 89b, 89c: slot | 91: armature coil |
| 91a: coil | 92: commutator piece |
| 92a, 92b: commutator piece | 93a, 93b: brush |
| 94: equalizer | |

The invention claimed is:

1. A linear actuator for electrically powered beds, used as a drive source for raising and lowering a bottom of a bed and being arranged beneath the bottom of the bed, comprising:
   a housing mounted to a frame of the bed;
   a shaft rotatably mounted in the housing and comprising a male threaded portion;
   a worm and a worm wheel configured to slow down and transmit rotation of a motor to the shaft;
   a screw nut screwed to the male threaded portion and configured to advance and retreat based on forward and reverse rotation of the shaft; and
   a piston tube fixed to the screw nut and configured to advance and retreat with respect to the housing and being connected to a link mechanism for raising and lowering the bottom, the motor comprising:
- four field poles fixed to a yoke inner circumferential surface;
- an armature in which an armature winding is wound by lap winding;
- a commutator arranged on the armature and electrically connected to the armature winding;
- two brushes that are arranged at positions offset by approximately 90° in a vertical positional relationship so as to prevent short circuiting caused by grush abrasion powder built up between the brushes and are in contact with a surface of the commutator;
- a plurality of coils connected to the commutator and configured to form the armature winding; and
- an equalizer configured to connect a sub-plurality of coils from among the plurality of coils that are to undergo potential equalization; and in that
- the motor is arranged beneath the bottom as a drive source of the linear actuator (1) so as to reduce the size of the space beneath the bottom.

2. A linear actuator for electrically powered beds according to claim 1, wherein
- the piston tube and the screw nut are coupled by a screw nut adapter mounted to the screw nut in a state in which the screw nut adapter is prevented from turning.

3. A linear actuator for electrically powered beds according to claim 2, wherein
- the worm is a multistart worm having two or more starts so as to decrease the number of revolutions of the motor to suppress the operating noise produced by the motor arranged beneath the bottom.

4. A linear actuator for electrically powered beds according to claim 1, wherein
- the worm is a multistart worm having two or more starts so as to decrease the number of revolutions of the motor to suppress the operating noise produced by the motor arranged beneath the bottom.

* * * * *